United States Patent [19]

Goodboy, Jr.

[11] 4,399,837
[45] Aug. 23, 1983

[54] BAGHOUSE VALVE CONSTRUCTION

[75] Inventor: George O. Goodboy, Jr., Glendale, Calif.

[73] Assignee: Joy Manufacturing Company, Pittsburgh, Pa.

[21] Appl. No.: 287,027

[22] Filed: Jul. 27, 1981

[51] Int. Cl.³ .............................................. F16K 1/00
[52] U.S. Cl. .............................. 137/614.11; 137/240; 251/DIG. 1; 251/332
[58] Field of Search ............... 251/332, 333, 360, 210; 137/DIG. 1, 614.11, 312, 240; 277/228

[56] References Cited

U.S. PATENT DOCUMENTS

| | | | |
|---|---|---|---|
| 2,859,061 | 11/1958 | Reid | 277/228 |
| 3,092,133 | 6/1963 | Clark | 251/332 |
| 3,829,062 | 8/1974 | Fend | 251/332 |
| 3,898,062 | 8/1975 | Slakey | 55/269 |
| 3,945,400 | 3/1976 | Slakey | 137/608 |
| 3,963,467 | 6/1976 | Rolschau | 55/284 |
| 3,975,173 | 8/1976 | Peterson et al. | 55/96 |
| 4,113,449 | 9/1978 | Bundy | 55/96 |
| 4,239,061 | 12/1980 | Peterson | 137/614.11 |

Primary Examiner—Martin P. Schwadron
Assistant Examiner—J. R. Shay
Attorney, Agent, or Firm—E. Lawrence Levine

[57] ABSTRACT

A baghouse valve construction including an annular valve seat member and valve member adapted to cooperate with the same in assuming open and closed relative positions. The valve seat having a pair of annular, radially spaced resilient seal members and at least one generally rigid seal member. Retainers secure the resilient seal members in relative spaced position. The valve seat may have two generally rigid seal members. One generally rigid seal member may be adjustable relative to the position of the valve element. In a preferred form, the resilient seal members have a core composed of a first material and a tubular outer member composed of a second material.

15 Claims, 6 Drawing Figures

BAGHOUSE VALVE CONSTRUCTION

BACKGROUND OF THE INVENTION

1. Field of the Invention

The present invention relates to baghouse valves, and more specifically, to unique seal constructions for such valves which are adapted for such uses as by-pass valves, for example.

2. Description of the Prior Art

It has been known for many industrial applications, such as in connection with coal-fired utility boilers, cement kilns and other uses to purify emerging, unclean air and gases through the use of baghouses. In connection with such baghouses, various sorts of flow arrangements and valving concepts for the air or gas being handled have been known. See, for example, U.S. Pat. Nos. 3,898,062; 3,945,400; 3,963,467; 3,975,173 and 4,113,449.

It has also been known to employ poppet-type valves in connection with such usage. For by-pass usage, it is critical that undesired seepage of dirt-containing air or gas through the valve so as to permit undesired comingling with cleaned gas or air be resisted. It has been known to employ double-dished valve elements, each provided with a sealing action at the respective seats and to purge the space between the double-dished heads.

There remains a very real and substantial need for a seal for use in baghouses and, in particular, in respect of by-pass valves for the same, which provide improved efficiency of sealing action, simplicity of design and effective resistance to undesired contamination of cleaned gases or air.

SUMMARY OF THE PRESENT INVENTION

The above-described need has been met by the present invention. In a preferred embodiment of the present invention an annular valve seat member cooperates with a valve element to provide the desired sealing action. The valve seat has a pair of annular, radially spaced, resilient seal members and at least one generally rigid seal member. Retainer means are provided to secure the resilient seal members in their desired relative positions.

In one embodiment, a rigid seal member is adjustable so as to permit relative movement toward and away from the valve element. Another preferred feature of the invention includes a unique combination of materials employed in the resilient seal members wherein a fluoroelastomer is disposed in surrounding relationship with a core member of a different material, such as a silicone rubber, for example.

It is an object of the present invention to provide a valve construction for baghouses wherein improved seal means are provided.

It is a further object of this invention to provide such a seal which consists of two elastomeric sealing members in combination with at least one generally rigid sealing member.

It is a further object of this invention to provide such a valve construction wherein a single valve disc may be employed and yet undesired seepage through the closed valve is effectively resisted.

It is another object of the present invention to provide a seal construction which cooperates to define a purge chamber.

It is yet another object of the present invention to provide a unique composite elastomeric seal element for use in the valve seal.

It is a further object of the present invention to provide such a seal construction which is economical to manufacture and use and efficient in operation.

These and other objects of the invention will be more fully understood from the following description of the invention on reference to the illustrations appended hereto.

DESCRIPTION OF THE PREFERRED EMBODIMENTS

While for convenience of disclosure herein, emphasis will be placed upon a valve construction which is uniquely suited to function as a by-pass valve, it will be appreciated that the valve construction may readily and advantageously be employed in other baghouse uses. When used as a by-pass valve, the valve may be positioned in any desired location within the system such as at the inlet, or in a plate between the inlet and outlet sections, for example.

Figure 1:
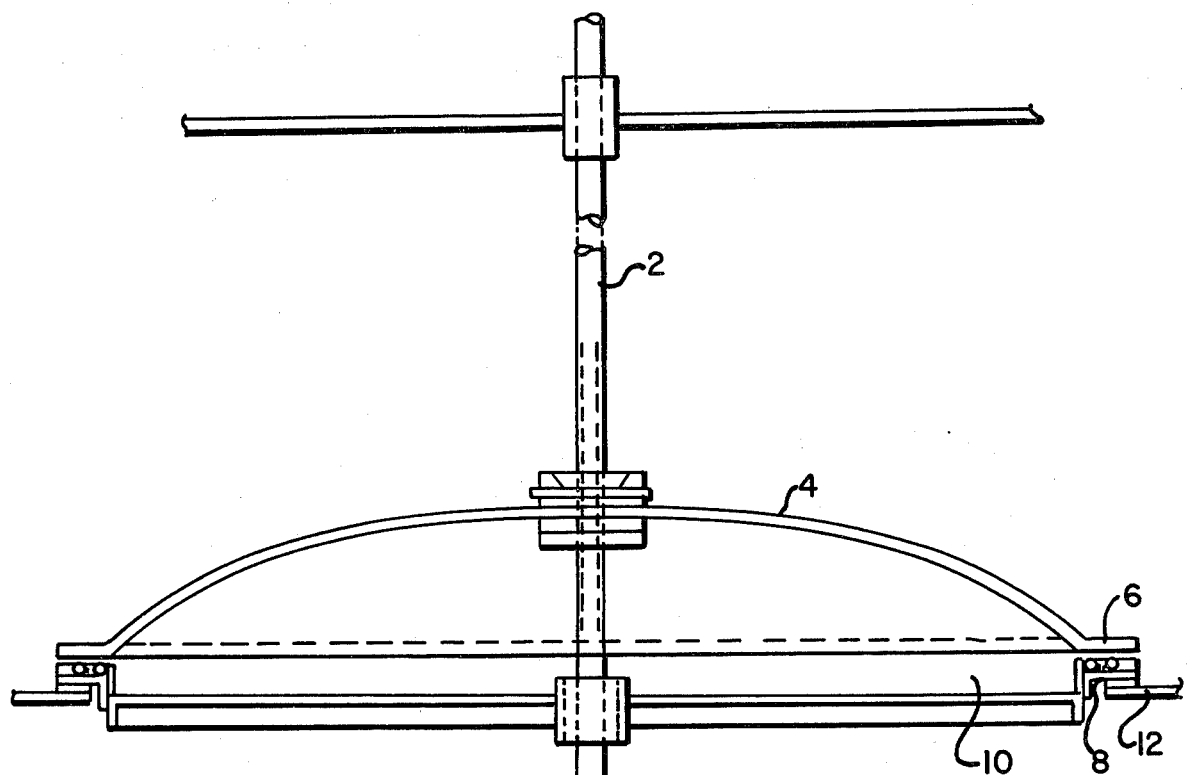
FIG. 1 is a partially schematic cross-sectional illustration of a form of valve of the present invention.

Referring now in greater detail to FIG. 1, there is shown schematically a form of valve construction of the present invention.

Referring now more specifically to FIG. 1, there is shown a valve construction wherein a valve stem 2 has secured to it a generally dish-shaped downwardly or upwardly concave valve element 4 which has an outer peripheral flange 6 in engagement with valve seat 8. The annular valve seat 8 defines an opening 10 in the wall 12. In the position illustrated in FIG. 1, the valve element 4 is in nearly closed position and passage of air or gas through opening 10 is resisted.

Figure 2:
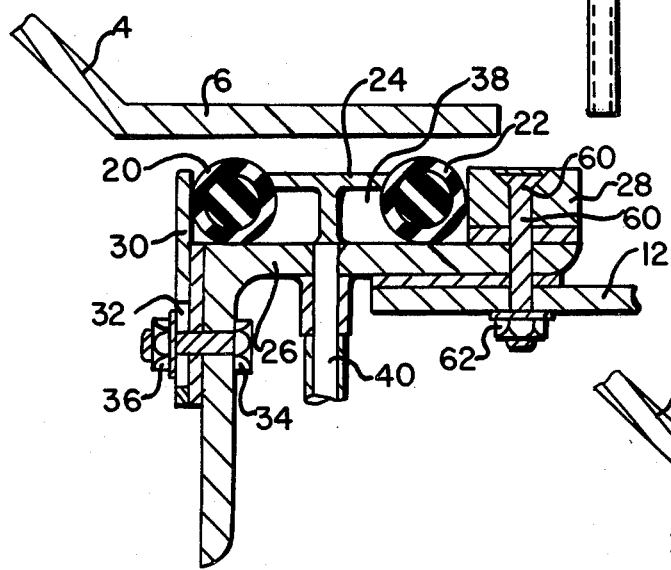
FIG. 2 is a fragmentary cross-sectional illustration of a form of valve seat-seal combination of the present invention.

Referring now to FIG. 2 in greater detail, it is seen that the lower surface of flange 6 is spaced above a pair of resilient seal members 20, 22 which are adapted to be in resiliently maintained compressed relationship with flange 6 when the valve element 4 is moved downwardly to the closed position wherein flange 6 will compress the seals 20, 22. As will be appreciated, in the form shown, the seals are of generally circular, cross-sectional configuration, are preferably annular in shape and are generally radially spaced from each other. An annular, preferably substantially continuous retainer member 24 secured to valve seat base portion 26 engages and retains resilient seal members 20, 22 in their relative positions. Positioned generally radially outwardly of resilient seal 22 is substantially rigid seal member 28 which, in the form shown, contacts resilient seal member 22 and is of lesser height than seal member 22. Positioned generally radially inwardly of resilient seal 20 and in contacting relationship therewith is rigid

::::

seal member 30. In a preferred form of the invention, the rigid seal member 30 is generally vertically adjustable so as to permit relative movement toward or away from the valve element flange 6. This may readily be accomplished in many ways, as by providing an elongated slot 32, which cooperates with bolt 34 and nut 36 in permitting the desired adjustment. In a preferred form of the invention the generally rigid seal members 28, 30 will be composed of a suitable metallic material such as steel, or aluminum, for example.

Continuing to refer to FIG. 2, it will be noted that when the flange 6 is in compressive engagement with seals 20, 22, a purge chamber 38 is defined within the sealed region. In order to resist undesired passage of air or gases through the seal, in addition to the action of the sealing members 20, 22, 28, 30, a purge pipe 40 is in communication with chamber 38 through base portion 26 so as to permit the chamber pressure to be at the desired level. In a negative flue pressure system, chamber 38 will preferably be at ambient pressure (less purge air conduit loss). The pressure differential across the seal will be the operating pressure of the flue minus the chamber pressure. In a positive pressure system, the chamber 38 will be about 1 to 5 inches $H_2O$ gauge pressure above the operating pressure.

Figure 3:
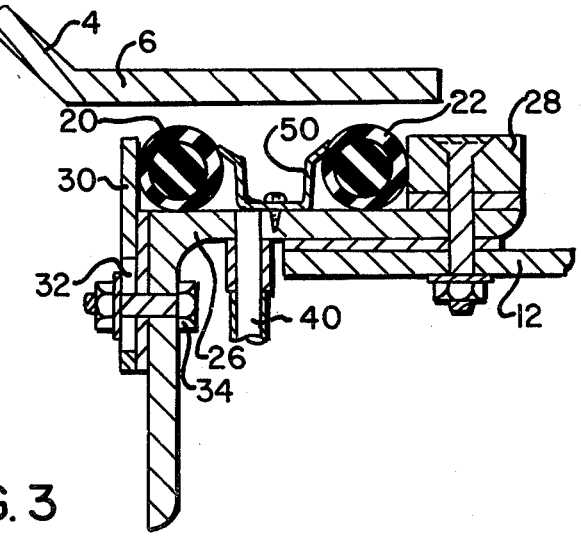
FIG. 3 is a cross-sectional illustration similar to FIG. 2 but showing a modified form of retainer means.

Referring now to FIG. 3 there is shown a similar construction to that illustrated in FIG. 2, but with a different form of retainer. Whereas the retainer 24 shown in FIG. 2 is of generally T-shaped cross-sectional configuration and preferably annularly substantially continuous, the retainer member of FIG. 3 is preferably generally U-shaped with outwardly diverging upper flange portions in engagement with the resilient seals 20, 22. In this embodiment, it is preferred that the retainer 50 be in the form of a plurality of circumferentially spaced clip members 50 secured to base portion 26.

Figure 4:
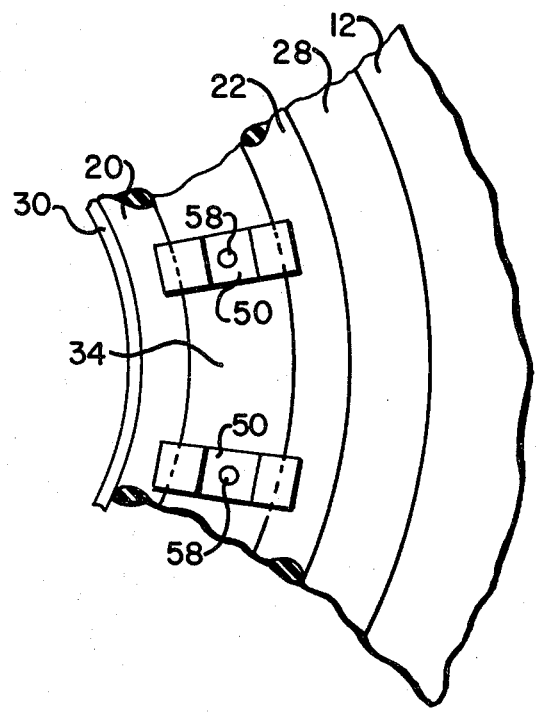
FIG. 4 is a plan view of a form of valve seat of the present invention.
Figure 5:
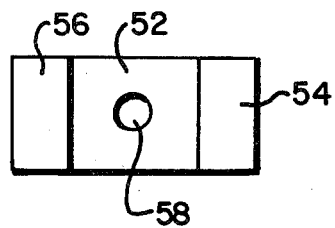
FIG. 5 is a plan view of a form of retainer means of the present invention.

Referring now to FIGS. 4 and 5, there is shown in FIG. 4 a plan view of a form of valve seat of the present invention. The annular adjustable rigid seal member 30 is in abutting contact with resilient seal 20 which is retained in position by a plurality of individual retainer clips 50, each of which has a base portion 52 provided with a fastener-receiving opening 58 and a pair of diverging arms 54, 56. One of the arms 54, 56 engages resilient seal 20 and the other engages resilient seal 22. Positioned radially outwardly of resilient seal 22 and in contact therewith is rigid seal member 28. Plate member 12 (illustrated as generally circular for convenience of illustration) is in generally underlying relationship with respect to valve seal base 26 and may advantageously be secured to annular seal 28 as by bolt 60 and nut 62 shown in FIG. 2.

Figure 6:
FIG. 6 is a cross-sectional illustration of a form of resilient seal member of the present invention.

Referring now to FIG. 6, there is shown a cross section of a seal of the type which may be employed for resilient seal members 20, 22. The seal member preferably has an outer tubular portion 70 composed of a first material and an inner core portion 72 composed of a different material. In a preferred embodiment of the invention the tubular member 70 will be an extruded tube composed of a fluoroelastomer and the core material will be a siliconized rubber material. This combination provides high temperature elastomeric sealing capability and will permit effective use at temperatures as high as about 450° to 500° F. It also provides for a high degree of conformability at low deformation pressures and favorable compression set characteristics. The use of a fluoroelastomer in tube 70 serves to provide a low permeability barrier, thereby protecting the core 72 from attack by potentially destructive materials such as $SO_2$. By the use of a siliconized rubber for core 72 increased elastic rebound and reduced cost are provided. Further, the siliconized rubber which would deteriorate rapidly from exposure to materials such as $SO_2$ is protected from such attack as well as being shielded from abrasion-type wearing. In a preferred embodiment the outer tubular member will have a thickness of about 0.04 to 0.10 inch and the core 72 will have a diameter of about 0.50 to 0.75 inch. Among the specific preferred fluoroelastomers are copolymers of vinylidene flouride and hexafluoropropylene (such as that sold under the trade designation "VITON", for example,) and tetrafluoroethylene. Among the preferred materials for the core 72 are rubbers such as closed cell silicone rubber and polyurethane foam.

It will be appreciated, therefore, that the present invention has provided an effective valve seal construction for use in baghouses wherein undesired passage of air or gas through the closed valve is effectively resisted. More specifically, by use of the preferred spaced resilient seal member in combination with the rigid seals and the purge chamber, the desired sealing action is obtained. Further, by employing a combination of materials in the resilient or elastomeric seal members, durability and optimum properties of the sealing materials are provided.

Whereas particular embodiments of the invention have been described above for purposes of illustration, it will be evident to those skilled in the art that numerous variations of the details may be made without departing from the invention as defined in the appended claims.

I claim:

1. A baghouse valve construction comprising an annular valve seat member,
   a valve element adapted to assume a closed position in intimate engagement with said valve seat member and an open position spaced from said valve seat member,
   said valve seat having a pair of annular, radially spaced resilient seal members,
   said valve seat member having at least one generally rigid seal member; and
   retainer means for securing said resilient seal members in said relative radially spaced position.

2. The baghouse valve construction of claim 1 including
   said valve seat member having a base portion, and
   said retainer means removably securing said resilient seal members to said base portion.

3. The baghouse valve construction of claim 2 including said retainer means having at least a portion thereof interposed between said resilient seal members.

4. The baghouse valve construction of claim 3 including said retainer means including a substantially continuous annular retainer.

5. The baghouse valve construction of claim 3 including said retainer means having a plurality of clip members.

6. The baghouse valve construction of claim 1 including
   a pair of said generally rigid seal members,
   a first said rigid seal member disposed generally, radially inwardly of the innermost said resilient seal member, and a second said rigid seal member disposed generally radially outwardly of the outermost said resilient seal member.

7. The baghouse valve construction of claim 6 including
said first rigid seal member being adjustable with respect to said resilient seal members.

8. The baghouse valve construction of claim 7 including said first rigid seal member being movable in a direction generally toward and away from said valve element.

9. The baghouse valve construction of claim 8 including said second rigid seal member being fixedly secured with respect to said resilient seal members.

10. The baghouse valve construction of claim 6 including said rigid seal members being metallic.

11. The baghouse valve construction of claim 1 including said resilient seal members each having a resilient core composed of a siliconized rubber material having a diameter of about 0.50 to 0.75 inch and a tubular member disposed in surrounding relationship with respect to said core and composed of a fluoroelastomer material having a thickness of about 0.04 to 0.10 inch.

12. A baghouse valve construction comprising
an annular valve seat member having a base portion,
a valve element adapted to assume a closed position in intimate engagement with said valve seat member and an open position spaced from said valve seat member,
said valve seat having a pair of annular, radially spaced resilient seal members,
retainer means for securing said resilient seal members in said relative radially spaced position, said retainer means having a plurality of clip members and at least a portion of said retainer means being interposed between said resilient seal members, said retainer means securing said resilient seal members to said base portion, and
said valve seat member having at least one generally rigid seal member.

13. A baghouse valve construction comprising
an annular valve seat member,
a valve element adapted to assume a closed position in intimate engagement with said valve seat member and an open position spaced from said valve seat member,
said valve seat having a pair of annular, radially spaced resilient seal members,
said valve seat member having a pair of generally rigid seal members,
a first said rigid seal member disposed generally radially inwardly of the innermost of said resilient seal members and being adjustable with respect to said resilient seal members, and
a second rigid seal member disposed generally radially outwardly of the outermost of said resilient seal members.

14. The baghouse valve construction of claim 13 including said first rigid seal member being movable in a direction generally toward and away from said valve element.

15. The baghouse valve construction of claim 14 including said second rigid seal member being fixedly secured with respect to said resilient seal members.

* * * * *